United States Patent [19]

Hollander

[11] Patent Number: 4,541,177
[45] Date of Patent: Sep. 17, 1985

[54] DELIMBING SHEAR

[76] Inventor: Brian Hollander, Rte. 3, Box 346, Alachua, Fla. 32615

[21] Appl. No.: 480,876

[22] Filed: Mar. 31, 1983

[51] Int. Cl.$^4$ .............. B26B 13/26; B26B 17/00; B23D 15/00; A01G 23/08
[52] U.S. Cl. ............................. 30/180; 30/134; 30/379; 144/34 E
[58] Field of Search .............. 30/134, 180, 228, 379; 144/34 R, 34 E, 34 F

[56] References Cited

U.S. PATENT DOCUMENTS

| | | |
|---|---|---|
| 2,366,909 | 1/1945 | Johnson . |
| 2,385,419 | 9/1945 | Matulich .............................. 30/180 |
| 2,493,696 | 1/1950 | Potstada . |
| 3,058,214 | 10/1962 | Mekler .............................. 30/180 |
| 3,270,787 | 9/1966 | Rehnstrom . |
| 3,495,637 | 2/1970 | Walsh . |
| 3,580,310 | 5/1971 | Frankenberg et al. ........... 144/34 E |
| 3,613,752 | 10/1971 | Davis, Jr. ........................ 144/34 E |
| 3,626,477 | 12/1971 | Fulghum . |
| 3,814,152 | 6/1974 | Pallari . |
| 3,946,776 | 3/1976 | Oldenburg ...................... 144/34 E |
| 4,131,144 | 12/1978 | Fischer .......................... 144/34 E |
| 4,151,868 | 5/1979 | Fischer .......................... 144/34 E |
| 4,171,616 | 10/1979 | Keigley ............................ 30/180 |
| 4,217,000 | 8/1980 | Watanabe ...................... 144/34 E |
| 4,326,571 | 4/1982 | Crawford ........................ 144/34 E |
| 4,382,331 | 5/1983 | Kimura ............................. 30/180 |

Primary Examiner—Paul A. Bell
Assistant Examiner—Paul M. Heyrana, Sr.

[57] ABSTRACT

A delimbing shear attachment for a moveable boom mounted on a motorized or self-propelled vehicle having an operator's station such as a cab or platform from which the operator controls movement of the boom and attachment and the application of hydraulic power to an attachment mounted on the boom. The shear attachment comprises a mounting frame detachedly secured to the boom, an anvil member rigidly connected to said mounting frame and a cutting member pivotally connected at one end to the mounting frame and having a cutting edge disposed in cooperating relation with the anvil member. A double-acting hydraulic cylinder is operated in one direction to open the shear to receive a tree limb or other workpiece to be sheared and in the other direction to bring the cutting edge into engagement along its entire length with the anvil to shear off the workpiece. The anvil and cutting member are positioned on said mounting frame toward the side closest to the operator's cab, whereby an operator in the operator's cab will have the best possible view of the shear attachment and can most effectively control the movement of the boom and operation of the shear attachment. The anvil and cutting member are reinforced to resist deformation and the cutting member has an integral flange which helps retain the workpiece between the anvil and cutting member.

4 Claims, 5 Drawing Figures

DELIMBING SHEAR

BACKGROUND OF THE INVENTION

This invention relates to the shearing apparatus and is more particularly concerned with an apparatus for severing small trees and limbs from standing trees, for example, in clearing rights-of-way or other purposes.

In the past, tree delimbing has been accomplished by placing a man in a gondola which is attached to the end of a boom which is in turn part of a motorized or self-propelled vehicle. The gondola is positioned next to the limb and the man in the gondola cuts the limb with a saw. Other techniques use complicated remotely controlled saws or lightweight hand-held poles with a saw or shear attached to the end of the pole. With the man in the gondola, two operators generally are required and the man in the gondola is in an awkward, unsteady position as he is raised into the air at the end of the boom. The hand-held devices are cumbersome, have a limited reach and are inefficient for use on larger limbs.

SUMMARY OF THE INVENTION

The present invention includes a tree and limb shearing apparatus which may be attached to the distal end of a moveable boom which is in turn mounted on a motorized vehicle. The motorized vehicle and attached boom are not a part of this invention. Various types and forms of such booms and vehicles are well known in the art and are referred to and described herein for illustrative purposes only. The boom may be made of several moveable sections which may be telescoped or articulated or both and may be rotated about one or more axes. For example, the boom may be rotated about an axis along the longitudinal center of the boom; about a vertical axis passing through the center of the boom mounting point on the motorized vehicle and about a horizontal axis lying in a plane above such mounting point, allowing the boom to be rotated from somewhat below horizontal to approximately vertical. This range of motion provides great versatility for positioning the delimbing shear relative to the limb to be cut.

The boom on such vehicles is commonly offset from center to one side. These booms are ordinarly made with means for receiving various attachments such as a gondola in which an operator can be carried or a small clam shell or shovel for lifting and moving various bulk goods. The vehicle has a hydraulic pressure or power system and controls for utilizing that hydraulic pressure to operate the boom and its attachments. Various examples of such a vehicle, boom, hydraulic system and controls are well known in the prior art, are not part of the invention and are not described in detail herein except to the extent necessary to show their relationship with the present invention. Such descriptions are for illustrative purposes only and not intended to limit the invention.

The delimbing shear attachment is made to be removably attached to the end of such a boom and to be connected to a pair of high pressure lines from the hydraulic pressure system. Existing controls and hydraulic lines on the vehicle may be used or, if necessary, control valves and hydraulic lines may be added to control and provide for the flow and return of hydraulic fluid to and from the hydraulic power system on the vehicle.

The limb shearing apparatus includes a frame made from a single member or comprised of plates and/or tubular members welded or otherwise joined into a rigid unitary structure. An anvil made of a substantial plate is secured to the frame. A sharpened cutting member or blade is pivotally mounted to the frame and a double-acting hydraulic cylinder, of the type which is commonly known in the art, is connected between the frame and the cutting blade to operate the blade. The cutting member, anvil and hydraulic cylinder are mounted to the side of the mounting frame closest to the vehicle operator's cab so that the operator may have the best possible view of the shear attachment and can most effectively control the movement of the boom and operation of the shear attachment. This offset arrangement also permits the shear to cut a small tree closer to the ground. The anvil is reinforced with a box-like structure and the blade is reinforced with a flange along its perimeter. This flange is formed to also assist in retaining a workpiece within the shear during cutting movement of the shear and to urge a workpiece out of the narrow throat portion of the shear.

Accordingly, it is an object of the present invention to provide a tree and limb shear attachment which may be operated from a remote position by a machine operator.

Another object of this invention is to provide a delimbing shear which is relatively inexpensive to manufacture yet is rugged and efficient in operation.

Another object of this invention is to provide a delimbing shear attachment which is readily maneuverable by a remote operator for proper positioning of the shear to cut and clear tree limbs or trees from overheard to near ground level.

Another object of this invention is to provide a delimbing shear which has a rigid anvil and blade which resist distortion when cutting large or hard limbs or other large work pieces or if the shear or work piece is moved during cutting movement of the shear.

Another object of this invention is to provide a delimbing shear attachment which is mounted in such a position at the end of a machine mounted boom that the operator will have the best possible view of the shear attachment and can most effectively control the movement of the boom and operation of the shear.

Still another object is to provide a delimbing shear attachment with means to help retain a workpiece between the cutting blade and anvil during cutting movement of the shear.

These and other objects, features and advantages of this invention will become apparent from the following description in conjunction with the accompanying drawings.

DESCRIPTION OF THE PREFERRED EMBODIMENT

Figure 4:
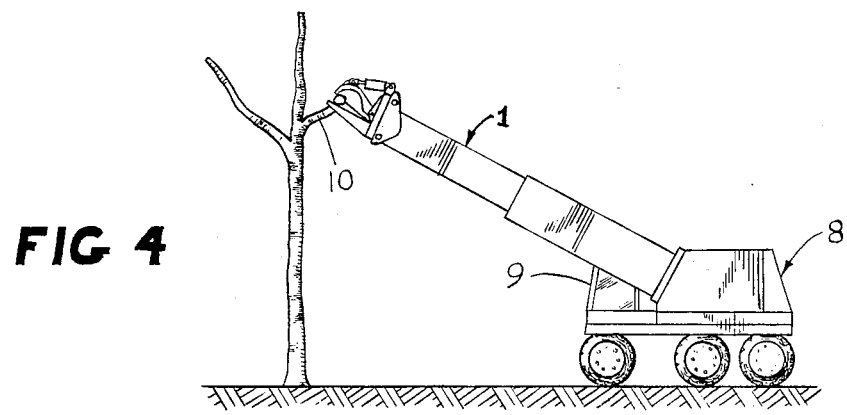
FIG. 4 is a side view of the apparatus as shown in FIG. 3.
Figure 3:
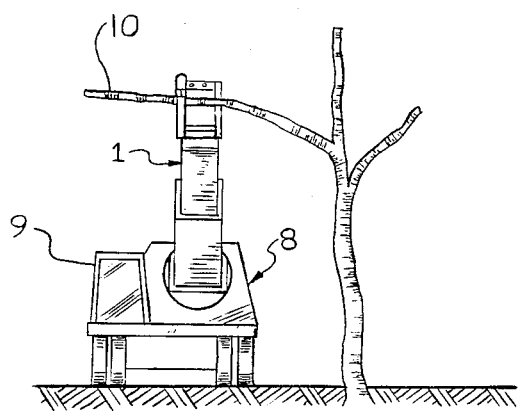
FIG. 3 shows the apparatus of the invention attached to a boom on a motorized vehicle and in position to sever a limb.

Referring to the drawings, the delimbing shear attachment 11 comprises in general a mounting frame 7 having a front face 36, a moveable cutting member 4 pivotally connected to said mounting frame, an anvil member 5 and a double acting hydraulic cylinder 3 pivotally connected at one end to the mounting frame and at the other to the cutting member. The mounting frame is constructed to complement the mounting means provided on the boom. In this case the boom is shown as having at its end a pair of brackets 15 and a mounting plate 14 secured thereto. The mounting plate has an arcuate recess 20 at its lower end and a pair of bore holes 21 at its upper end for receiving bolts or other attached means. As seen in FIG. 3, the boom is mounted to one side of a motorized vehicle 8 and an operator's cab 9 is mounted on the other side of the vehicle. As can be seen in FIGS. 3 and 4, the operator of the vehicle can maneuver the vehicle and boom into a position where the shear can be made to engage a limb 10 or other workpiece and by operating the shear, sever and detach a portion of the workpiece as will hereinafter be more specifically described.

Referring now in detail to the preferred embodiment, it can be seen that the mounting frame 7 is comprised of a pair of tubular sections 17 and 18 preferably closed at their ends and joined together by a top frame member or plate 16 which has in it bore holes 22 which align with the bore holes 21 in the mounting plate 14 of the boom and a tubular frame member or rod 19 which cooperates with the arcuate recess 20 in the bottom of the mounting plate 14. The spacing between frame members 17 and 18 is such that mounting plate 14 will fit snugly between them. The shape, size and configuration of mounting frame 7 is made to complement whatever mounting means are provided on the boom to which the attachment is to be secured. The configuration shown here is selected for illustrative purposes only. To secure the attachment to the boom, tubular member 19 is slipped into the recess 20 in the bottom of mounting plate 14 and the top frame member 16 is moved back to contact plate 14. Bolts 23 are inserted through the aligned bores 21 and 22 and secured therein by nuts 24. To remove the attachment the process is reversed. As can be seen, the attachment can be quickly and easily secured to and removed from the mounting means provided on a particular boom.

The shearing means consists of the anvil member 5, a cutting member 4 and a double acting hydraulic cylinder 3. Anvil member 5 consists of an anvil plate 13 rigidly secured to tubular frame member 18 and substantially perpendicular thereto, an anvil support plate 38 of triangular configuration secured under the anvil plate 13 and to the frame member 18, one or more stiffeners 39, 40 secured to the sides of the anvil support plate 38, bottom plate 41 which is secured to the diagonal edge of anvil support plate 38 and side plates 42, 43 which are secured to anvil plate 13, tubular frame member 18 and bottom plate 41 to form a completely enclosed box like structure which will greatly resist deformation of the anvil member. In addition, triangular gussets 37 may be secured between one end of anvil plate 13 and tubular frame member 18.

Cutting member 4 comprises a relatively broad flat blade 12 sharpened along its cutting edge 44 and a reinforcing member 6 which is rigidly and permanently attached to the blade 12 and surrounds the entire blade except the cutting edge. The portion 47 of the blade which extends from about the middle of the length of the cutting edge and toward the free end of the blade has a substantially even depth from the cutting edge to the inside edge of the reinforcing member. This is the deepest part of the blade and is approximately equal to the thickness of the largest workpiece the shear is designed to cut. Blade reinforcing member 6 has a portion 46 adjacent to the free end of the blade and a sloping portion 45.

Figure 1:
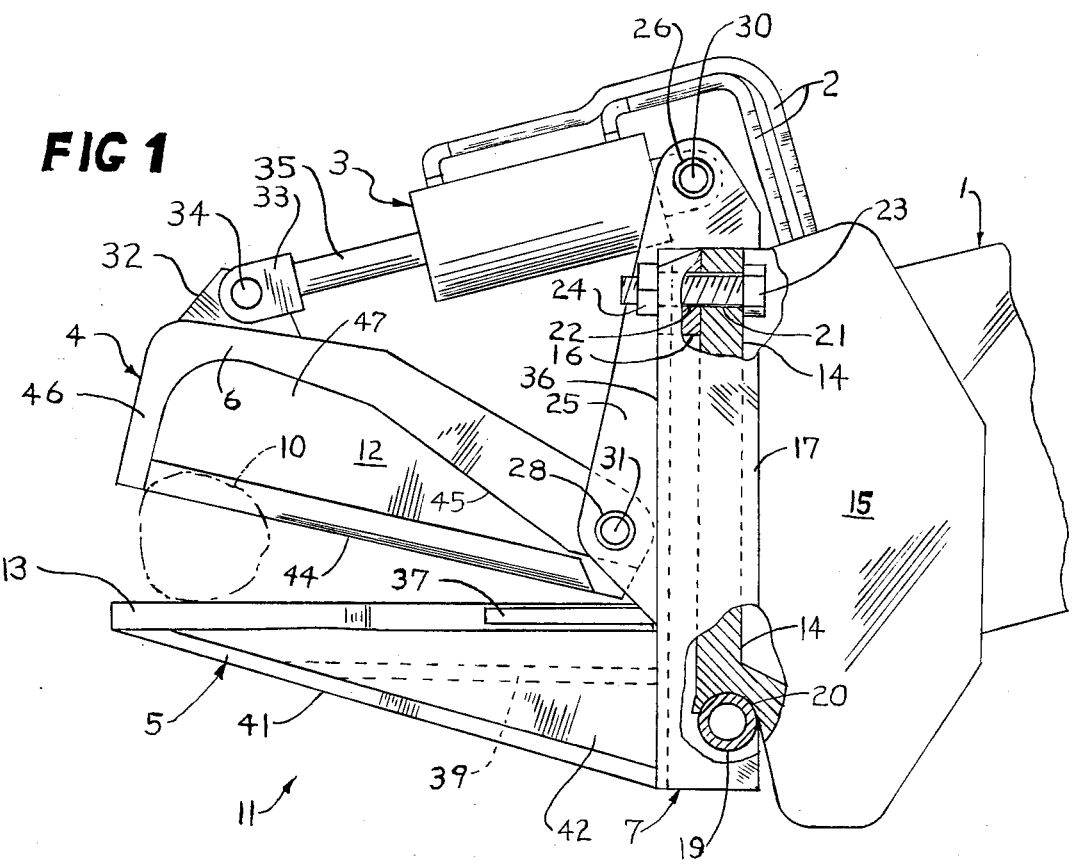
FIG. 1 is a side view, partly in cross section, of the delimbing shear attached to the distal end of a vehicle mounted boom, with portions of the mounting frame broken away to show the means for securing the attachment to the boom.
Figure 2:
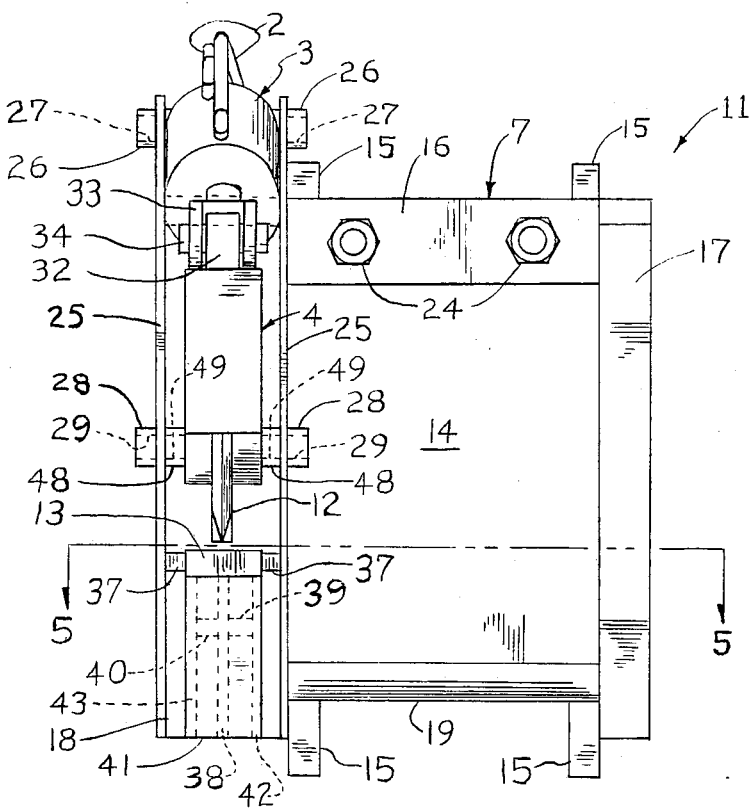
FIG. 2 is a front view of the attachment and proximate portions of the boom.
Figure 5:
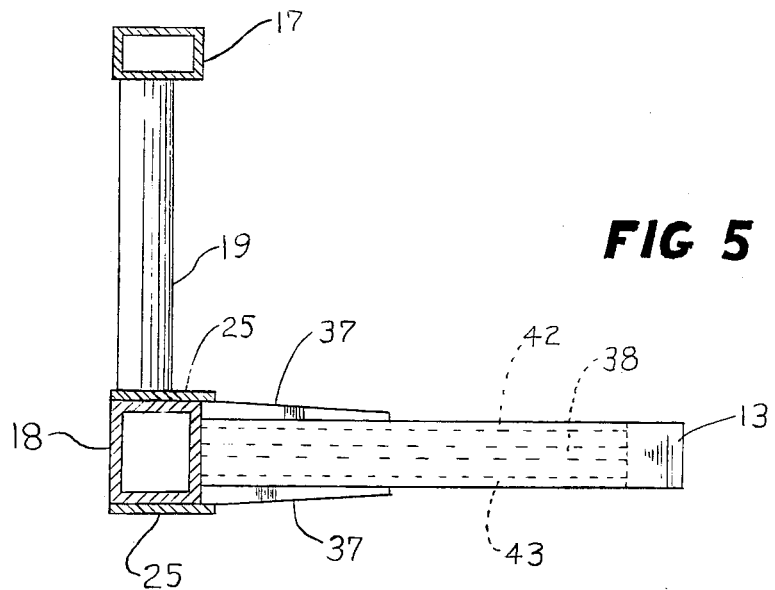
FIG. 5 is a cross sectional view of the apparatus taken along the line 5—5 in FIG. 2

Two brackets 25 are rigidly secured to tubular frame member 18 and are spaced from each other and parallel with each other. The brackets 25 are provided with upper bosses 26 which have journals 27 which carry pivot pin 30 and lower bosses 28 which have journals 29 in which are journaled pivot pin 31. Reinforcing flange 6 has bosses 48 which have journals 49 which also receive pivot pin 31. As can be seen in FIGS. 1 and 2 pivot pin 31 pivotally supports cutting member 4 and pivot pin 30 supports one end of hydraulic cylinder 3.

The various parts of the shear which are permanently secured to each other may be attached by welding, which is preferred, but other means of joining may be used, particularly if the shear is made of a material which cannot be welded.

As previously stated the vehicle on which the boom and attachment are mounted is provided with a hydraulic pressure system, not shown, and with hydraulic pressure hoses 2 extending to the end of the boom for attachment to various machines which may be attached to and operated at the end of the boom. Remote controls, not shown, or controls, not shown, in the operator's cab, are customarily provided whereby one of the hoses will conduct fluid under pressure to the particular attachment and the other hose will act as a return line to return hydraulic fluid from the attachment to the hydraulic system on the vehicle. The controls may be constructed so that in one position they will cause hydraulic fluid from the pressure side of the hydraulic system to be applied through one hose to operate an attachment and to be returned through the other hose to the low pressure side of the hydraulic system and in another position they will cause pressure to be applied through said other hose with the said one hose becoming a conduit for the return. Such a control system is well known in the prior art and if not already provided on the vehicle can be added or the existing controls modified to provide such operation in a manner well known in the prior art. The doubleacting cylinder 3 is also of a well known type having an internal piston, not shown, which operates when pressure is applied through one of the hoses 2 to extend the piston rod 35 and when pressure is applied through the other of the hoses 2 to retract the piston rod 35. Piston rod 35 carries a clevis 33 which may be attached by means of a clevis pin 34 to a member to be operated by the hydraulic cylinder. In this case blade reinforcing member 6 is provided with a trunnion 32 which can be attached to clevis 33 by clevis pin 34 and consequently can be caused to pivot by the operation of hydraulic cylinder 3.

OPERATION

In operation, the delimbing shear 11 is maneuvered into position adjacent to a workpiece such as a tree or limb to be cut, by movement of the vehicle 8 and the boom 1. Hydraulic cylinder 3 is operated to retract piston rod 35 thereby opening the shear so that the workpiece can be received between the anvil 13 and the cutting edge 44. The boom is then further operated to introduce the workpiece into the shear and the boom is held in position. Hydraulic pressure is then applied to cylinder 3 to extend piston rod 35 and force cutting member 4 to pivot toward anvil 13. As cutting member 4 is pivoted toward anvil plate 13, cutting edge 44 begins to cut through the workpiece. Cutting movement will also tend to force the workpiece out from the shear but portion 46 of reinforcing member or flange 6 will prevent the workpiece from so escaping. It will also be noticed that the reinforcing flange 6 has a sloping portion 45 near its pivoted end. If a large workpiece is caught in the throat portion of the shear it will be cammed toward the deeper portion of the blade by the sloping surface 45 as the blade is pivoted toward the anvil.

Anvil member 5 and cutting member 4 are so constructed and arranged that cutting edge 44 will contact anvil 13 along substantially the full length of the cutting edge at the end of the cutting stroke, providing for positive, complete shearing of a workpiece.

It will be obvious to those skilled in the art that many variations may be made in the specific embodiment here presented without departing from the scope of the present invention as set forth in the appended claims.

What is claimed is:

1. A delimbing shear attachment for a moveable boom, said shear attachment comprising a mounting frame having a front face and adapted to be detachably secured to said boom, said mounting frame including a pair of laterally spaced tubular sections, one of said tubular sections being of substantially greater cross section than the other, an anvil member rigidly connected to said mounting frame and extending outwardly from the front face of the mounting frame, a cutting member pivotaly connected at one end to said mounting frame and having a cutting edge disposed in cooperating relation with the anvil member, means selectively operable to pivot said cutting member in one direction to provide an opening between the anvil member and the cutting member to receive a workpiece to be sheared and to pivot said cutting member in the opposite direction wherein the cutting edge will be urged toward engagement with the anvil member thereby to sever a workpiece about which the shear has been positioned, said anvil and cutting members both lying in a plane extending along the length of said one of said tubular sections and being attached to said one of said tubular sections adjacent one of its ends whereby to permit a better view of the shear attachment and more effective control of its operation by an operator viewing the shear attachment from the direction of said one of said tubular sections.

2. A shear attachment as in claim 1 wherein the anvil member comprises an anvil plate and support means permanently and rigidly secured between the anvil plate, and said mounting frame to resist deformation of said anvil plate, said anvil plate support means being of hollow box structure and substantially the same length as the anvil plate.

3. A delimbing shear attachment for a moveable boom, said shear attachment comprising a mounting frame having a front face and adapted to be detachably secured to said boom with its front face disposed in a direction away from the boom, said mounting frame further comprising a pair of laterally spaced tubular sections defining the lateral edges of said mounting frame, one of said tubular sections being of substantially greater cross section than the other, an anvil member rigidly connected adjacent one end of said one of said tubular sections and extending outwardly from said front face, a cutting member pivotally connected at one of its ends to the one of said tubular sections near said one end thereof and in cooperating relation with said anvil member, said cutting member and said anvil member lying substantially in a plane extending along the length of said one of said tubular members, means connected between the other end of the one of said tubular sections and the other end of said cutting member and being selectively operable to pivot said cutting member in one direction to provide an opening between the anvil member and the cutting member to receive a workpiece to be sheared and to pivot said cutting member in the opposite direction wherein the cutting member will be pivoted toward engagement with the anvil member thereby to sever the workpiece, the location of the anvil and cutting members on said one of said tubular sections permitting a better view and more effective control thereof by an operator viewing them from the direction of said one of said tubular sections.

4. A delimbing shear attachment as in claim 3 wherein said anvil member is positioned substantially at right angles to said front face and said cutting member has a cutting edge of substantially rectilinear configuration.

* * * * *